(No Model.)
M. SUESS.
MACHINE FOR DECORATING GLASS AND THE LIKE.
No. 474,701. Patented May 10, 1892.
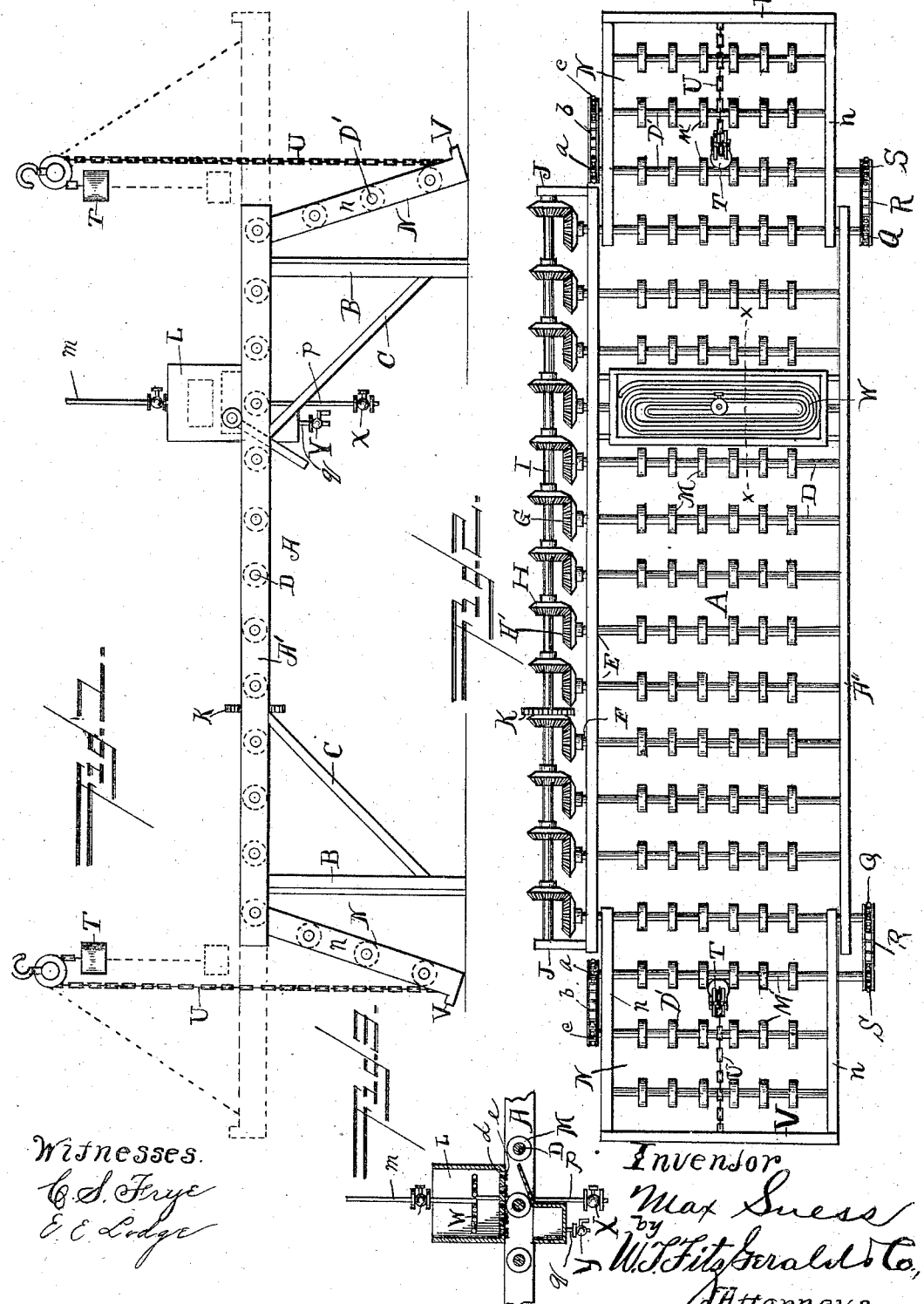
Witnesses
C. S. Frye
E. E. Lodge
Inventor
Max Suess
by
W. T. Fitzgerald & Co.,
Attorneys

UNITED STATES PATENT OFFICE.

MAX SUESS, OF CHICAGO, ILLINOIS.

MACHINE FOR DECORATING GLASS AND THE LIKE.

SPECIFICATION forming part of Letters Patent No. 474,701, dated May 10, 1892.

Application filed November 3, 1891. Serial No. 410,749. (No model.)

*To all whom it may concern:*

Be it known that I, MAX SUESS, a citizen of the United States, residing at Chicago, in the county of Cook and State of Illinois, have invented certain new and useful Improvements in Methods of and Mechanism for Treating Glass and other Surfaces; and I do hereby declare the following to be a full, clear, and exact description of the invention, such as will enable others skilled in the art to which it appertains to make and use the same.

My invention has relation to improvements in machines for decorating glass and the like; and it consists in the peculiar construction, certain novel combinations, and the adaptation of parts hereinafter described, and particularly pointed out in the claims appended.

In the accompanying drawings, Figure 1 is a side elevation of my improved machine.
Fig. 2 is a top plan view of the same, and Fig. 3 is a detail section taken in the plane indicated by the line $x$ $x$ in Fig. 2.

In the said drawings similar letters designate corresponding parts throughout the several views, referring to which—

A indicates the horizontal main frame of my improved machine, which is preferably of a general rectangular form and preferably comprises the longitudinal bars A', which may be connected together and braced in any approved manner. This main frame A is preferably provided at points adjacent to its ends with supporting-legs B, which may be connected to the frame in any approved manner and are preferably braced by the brace-arms C, as illustrated.

Journaled in the longitudinal bars A' of the main frame at suitable intervals in the length thereof are the transverse rotary shafts D, upon which are mounted at a suitable distance apart the friction-disks M, the peripheries of which are preferably covered with rubber, felt, or the like, so as to adapt them to more positively engage the surface of the glass.
Pivotally connected in a suitable manner to the ends of the frame A are the frames $n$ of the adjustable sections N, which are preferably of a rectangular form and are provided at their ends with ledges V, designed and adapted to hold a sheet of glass in position upon the sections, which are designed and adapted to lift the glass to the surface of the main frame and lower the glass therefrom.

Journaled in the longitudinal bars $n$ of the adjustable sections N is a series of shafts D', similar to those of the main frame, and mounted on these shafts D' are friction-disks M', similar to those before described.

Journaled in suitable bearings, as J, adjacent to one of the longitudinal bars of the frame A, is a longitudinal rotary shaft I, which may be driven by any suitable motor through the medium of the sprocket-wheel K. Fixed upon this shaft I at intervals in the length thereof are beveled gear-wheels H, which mesh with beveled gear-wheels H' on the ends of the shafts D', whereby it will be seen that said shafts will be rotated in a common direction and at a corresponding speed.

Fixed upon the ends of the end shafts D of the frame A are sprocket-wheels Q, which are connected by sprocket-belts R with sprocket-wheels S on the ends of the inner shafts D' of the sections N. Fixed upon the opposite ends of the inner shafts D' of the sections N are sprocket-wheels $a$, which are connected by sprocket-belts $b$ with sprocket-wheels $c$ on the adjacent ends of the next shafts D'. Thus it will be readily perceived that, regardless of the position of the sections N, two of the shafts D' thereof will be rotated in a corresponding direction and at a corresponding speed with the shafts of the main frame.

Connected at one end to the free ends of the sections N are chains U, which take over pulley-sheaves hung at a suitable distance above the frame A and are provided at their opposite ends with counterbalance-weights T, which serve to facilitate the raising of the sections N to the plane of the frame A when the same are loaded, as will be presently set forth.

Mounted at a suitable distance above the frame A is the reservoir L, which is preferably of the general form illustrated and is designed to contain paint, sand, etching chemicals, or the like through the medium of which the glass is to be decorated.

Formed in the bottom of the reservoir L is a series of apertures $d$ for the passage of the decorating agent, and connected to the said bottom and depending therefrom are bristles

*e*, which serve in practice to equally distribute the decorating agent over the surface of the glass or the like.

Leading from a suitable source of supply to the reservoir L is a steam-pipe *m*, which merges into a coil W within the reservoir, which coil serves to heat the contents of the reservoir and retain the required consistency thereof. The coil W merges in turn into the outlet-pipe *p*, which is preferably provided with a cock, as illustrated.

Leading from the bottom of the reservoir L is a drain-pipe *q*, which is provided with a cock, as Y, and is designed to drain the reservoir of its contents when desired.

In operation the glass or the like to be decorated is first covered with the desired stencil or stencil compound and is then placed upon the section N at one end of the frame A, through the medium of which it is lifted to the plane of said frame A, when through the medium of the disks M upon the shafts D it will be carried to and beneath the reservoir L and to the other end section N, through the medium of which it may be lowered to the ground.

By the provision of the end sections N, as described, it will be readily perceived that heavy sheets of glass and the like may be lifted to the plane of the frame A with the exercise of but little effort upon the part of the operator.

Although I have specifically described the construction and relative arrangement of the several elements of my improved machine, yet I do not desire to be confined to the same, as such changes or modifications may be made as fairly fall within the scope of my invention.

Having thus described my invention, what I claim, and desire to secure by Letters Patent, is—

1. In a machine for decorating glass and the like, the combination, with the horizontal main frame, of a section pivotally connected to the main frame and having a transverse ledge at its free end, a chain connected at one end to the pivotally-connected section and taking over a pulley above the plane of the horizontal main frame, and a counterbalance-weight connected to the opposite end of the chain and adapted to serve, in conjunction with said chain, to raise the pivotally-connected section into the same horizontal plane as the main frame, substantially as and for the purpose set forth.

2. In a machine for decorating glass and the like, the combination, with the main frame, the reservoir mounted thereon, the shafts journaled in said frame and carrying friction-disks, and a suitable means for rotating said shafts, of the sections pivotally connected to the main frame and having ledges at their free ends, the shafts journaled in said sections and having friction-disks, a suitable means for rotating one or more of the rotary shafts of the pivotally-connected sections, and a suitable means for raising and lowering said sections, substantially as and for the purpose set forth.

3. In a machine for decorating glass and the like, the combination, with the main frame embodying mechanism for feeding or moving the glass, of the reservoir mounted upon the main frame and having a perforated bottom, the bristles depending from said bottom, a coil of pipe arranged in the reservoir, and a suitable means for conveying a heating agent to said coil of pipe, substantially as and for the purpose set forth.

In testimony whereof I affix my signature in presence of two witnesses.

MAX SUESS.

Witnesses:
CHR. STAHL,
H. C. FISCHER.